(12) United States Patent
Casile et al.

(10) Patent No.: US 7,356,491 B2
(45) Date of Patent: Apr. 8, 2008

(54) METHOD FOR TRANSFERRING LARGE SUPPLIER CATALOGS THROUGH THE INTERNET NETWORK

(75) Inventors: Olivier Casile, St. Laurent du Var (FR); Joaquin Picon, St. Laurent du Var (FR)

(73) Assignee: International Business Machines Corporation, Armonk, NY (US)

( * ) Notice: Subject to any disclaimer, the term of this patent is extended or adjusted under 35 U.S.C. 154(b) by 609 days.

(21) Appl. No.: 10/744,130

(22) Filed: Dec. 23, 2003

(65) Prior Publication Data

US 2004/0162736 A1     Aug. 19, 2004

(30) Foreign Application Priority Data

Feb. 13, 2003   (EP)   ................... 03368016

(51) Int. Cl.
*G06F 17/30*   (2006.01)

(52) U.S. Cl. ............................. 705/27; 707/1

(58) Field of Classification Search ............... 705/26, 705/27

See application file for complete search history.

(56) References Cited

U.S. PATENT DOCUMENTS

| | | | | |
|---|---|---|---|---|
| 6,496,208 B1* | 12/2002 | Bernhardt et al. | ........... | 715/853 |
| 6,907,401 B1* | 6/2005 | Vittal et al. | ................... | 705/26 |
| 2001/0032148 A1* | 10/2001 | Yamazoe et al. | ............. | 705/26 |
| 2003/0050859 A1* | 3/2003 | Rodriguez et al. | ............ | 705/27 |
| 2004/0117358 A1* | 6/2004 | von Kaenel et al. | ............ | 707/3 |

OTHER PUBLICATIONS

"Catalogs are foundation of e-marketplaces," Electronic Commerce News, May 22, 2000, Proquest # 53999761, 2 pgs.*
"MDL and Lancaster Exchange Catalog Data; Agreement Ensures Timely, Accurate Content in Chemical Sourcing Catalogs," Business Wire, Aug. 5, 2002, 3 pgs.*

* cited by examiner

*Primary Examiner*—Matthew S. Gart
*Assistant Examiner*—Jason B. Dunham
(74) *Attorney, Agent, or Firm*—Norman L. Gundel; Hoffman, Warnick & D'Alessandro LLC

(57) ABSTRACT

Method for transferring large supplier catalogs in a data transmission system including the Internet network, a marketplace site able to be addressed through the Internet network, a first plurality of customers connected to the Internet network and a second plurality of suppliers connected to the Internet network, each supplier having a catalog file of available goods to be supplied to any customer. The method includes the steps requesting by one supplier the transfer of its catalog file to the marketplace site through a B2B gateway by using a catalog control protocol, transferring the catalog file to the marketplace site through a catalog gateway by using a catalog transfer protocol, aggregating the catalog file received from the supplier to a general catalog, and publishing the updated general catalog onto a storefront web site so that any one of the customers can view the goods of the supplier.

7 Claims, 2 Drawing Sheets

METHOD FOR TRANSFERRING LARGE SUPPLIER CATALOGS THROUGH THE INTERNET NETWORK

TECHNICAL FIELD

The present invention relates to the Electronic marketplaces wherein several companies which are either suppliers or customers perform trading operations through the Internet network, and relates in particular to a method for transferring large supplier catalogs through the Internet network.

BACKGROUND

The Internet network commonly called the Web, is now reached by enterprises and commercial companies which are increasingly using it to perform business because it is fast and cheap.

Today, there are two types of business which are performed using the Web. The Business to Customer (B2C) allows a company to promote and market its products to individual consumers. Here we find all e-commerce sites, constituted of a Web site coupled to a catalog of goods, and of an e-commerce application allowing consumers to browse the catalog, select items and manage a virtual shopping cart, and eventually pay for the content of their shopping cart, which will be delivered off-line by regular mail services. A typical e-Commerce application is the IBM Websphere Commerce product, but many other products with similar functions are available from other software vendors.

The other kind of business, the Business to Business (B2B) allows companies to trade together. Typical B2B applications are e-Procurement and Supply Chain Management where a company selects and orders materials from suppliers, e-Collaboration where two partner companies cooperate to elaborate products, and Electronic Marketplaces, where several companies playing the roles of customers and suppliers perform trading operations such as RFQs (requests for proposals), auctions and reverse auctions, and contract management. E-Marketplaces are generally architected around a central catalog, as in the IBM Websphere Commerce Business Edition product, but other models exist where customers directly access the supplier's catalog through the e-Marketplace, which only handles transactions.

As the goods referenced in a catalog are generally not produced by the company operating the Electronic marketplace or e-commerce site and the descriptions of these goods including their prices usually come from applications run by the suppliers, there is a general or central catalog which is built at the marketplace site by aggregating the individual catalog from the various suppliers. However, the transfer of these catalogs from the suppliers to the general catalog in a efficient, secure and reliable manner is a critical problem.

The servers used today for B2B communication are known as B2B gateways such as the IBM partner agreement manager product, the IBM crossworld trading partner interchange product or equivalent products from other companies. As catalogs contain generally thousands of references, include descriptions, specification documents and images, they can be very large files of several hundreds of megabytes. The transfer of such large files through usual B2B gateways is inappropriate because these gateways have been designed to handle short exchanges of standard e-business messages requiring only validation and routing, and have relatively low performances in terms of transfer rate and capability of transporting large files of data.

SUMMARY OF THE INVENTION

Accordingly, the main object of the invention is to achieve a method and to provide a system for transferring large supplier catalogs through the Internet network by using a special gateway and a dual protocol which bypass the limitations of usual B2B gateways in terms of file size and transfer rates.

The invention relates therefore to a method for transferring large supplier catalogs in a data transmission system including the Internet network, a marketplace site able to be addressed through the Internet network, a plurality of customers connected to the Internet network and a plurality of suppliers connected to the Internet network, each supplier having a catalog file of available goods to be supplied to any one of the customers. This method comprises the steps of a) requesting by one supplier a transfer of its catalog file to the marketplace site through a business to business (B2B) gateway using a catalog control protocol, b) transferring the catalog file to the marketplace site through a catalog gateway using a catalog transfer protocol, c) aggregating the catalog file received from the supplier to a general catalog to provide an updated general catalog, and d) publishing the updated general catalog onto a storefront web site so that any customer can view the goods of the supplier.

BRIEF DESCRIPTION OF THE DRAWINGS

The above and other objects, features and advantages of the invention will be better understood by reading the following more particular description of the invention in conjunction with the accompanying drawings wherein.

DETAILED DESCRIPTION OF THE INVENTION

Figure 1:
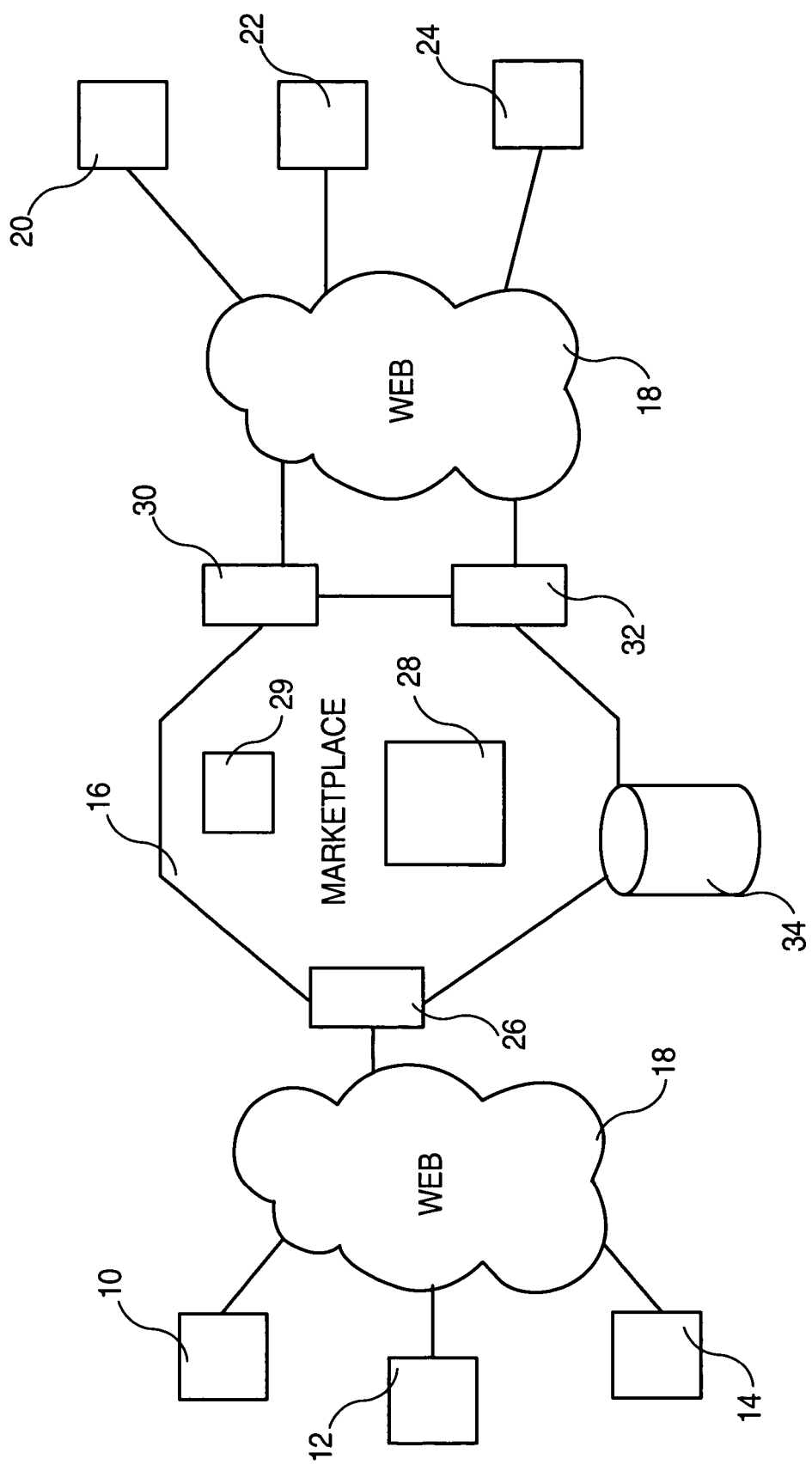
FIG. 1 represents a block-diagram of a data transmission system including a marketplace site wherein the method according to the invention is implemented.

A data transmission system wherein the method according to the invention is implemented is illustrated in FIG. 1. A first plurality of customers 10, 12, 14 can address a marketplace site 16 through the Web 18, and a second plurality of suppliers 20, 22, 24 can also address the marketplace site 16 through Web 18. The marketplace site 16 is a private or public exchange where catalogs of goods are available to the customers. Such an electronic marketplace site is, in fact, a Web site constituted of a commerce storefront 26, a catalog management application 28 and back-end gateways 30 and 32 for communicating with the suppliers. The marketplace is operated by a market maker or a distributor of any kind which distributes goods produced by the suppliers.

The storefront 26 which connects the marketplace site to the Web is usually a Web server running an e-commerce application such as the IBM Websphere commerce or equivalent application. The two back-end gateways which connect the marketplace site 16 to the Web are B2B gateway 30, which is specialized software having business-to-business capabilities and supporting communication channels such as EDI, HTTP, SMTP, and a catalog gateway 32, which is specialized software allowing the marketplace and the suppliers to exchange large catalog files in an efficient way according to the invention.

A general catalog which results from the aggregation of the supplier catalogs is stored in a catalog database 34. Each catalog file is in an electronic format, generally XML. The suppliers send their catalog file to the marketplace through the Web, using the HTTP protocol. The catalog manager 28 processes the catalog files received from the supplier, runs an approval flow for these catalogs, checks the catalogs, performs transformations in order to put each received catalog file in a format appropriate for the general catalog database 34, aggregates all the catalog files into a single file and publishes the general catalog to the storefront 26. Note that an administrator 29 has the responsibility and rights to administrate the software components of the marketplace site 16.

The method according to the invention is based upon two combined protocols. A catalog control protocol allows a supplier (20, 22 or 24) and the marketplace 16 to coordinate the actual transfer of a large catalog file using a catalog transfer protocol. Basically, the supplier requests to the marketplace the authorization to transfer a catalog of items. The marketplace responds with the authorization (or denial), and with the address of the dedicated catalog gateway where the large catalog file should be sent by the supplier. Once the catalog is entirely transferred using the second protocol, the Catalog Control Protocol then allows the supplier and the marketplace to cross-check that the catalog transfer was completely and successfully performed, and initiates the aggregation of the received catalog with the single catalog of the marketplace. The Catalog Control Protocol is implemented using the B2B gateway 30, typically using XML messages over the HTTPs Web protocol, Web Services, EDI, or other common Web protocols.

The catalog transfer protocol is implemented within the specific catalog gateway 32, typically based on an Application Server, and segments the large catalog in a number of messages of a reasonable size so that each of the messages can be rapidly transferred and processed in order to reassemble the complete catalog file within the general catalog file of the marketplace. The Catalog Transfer Protocol can typically be implemented using the HTTP protocol running within the catalog gateway, but other implementations could be envisioned using FTP or other appropriate file transfer protocols.

Figure 2:
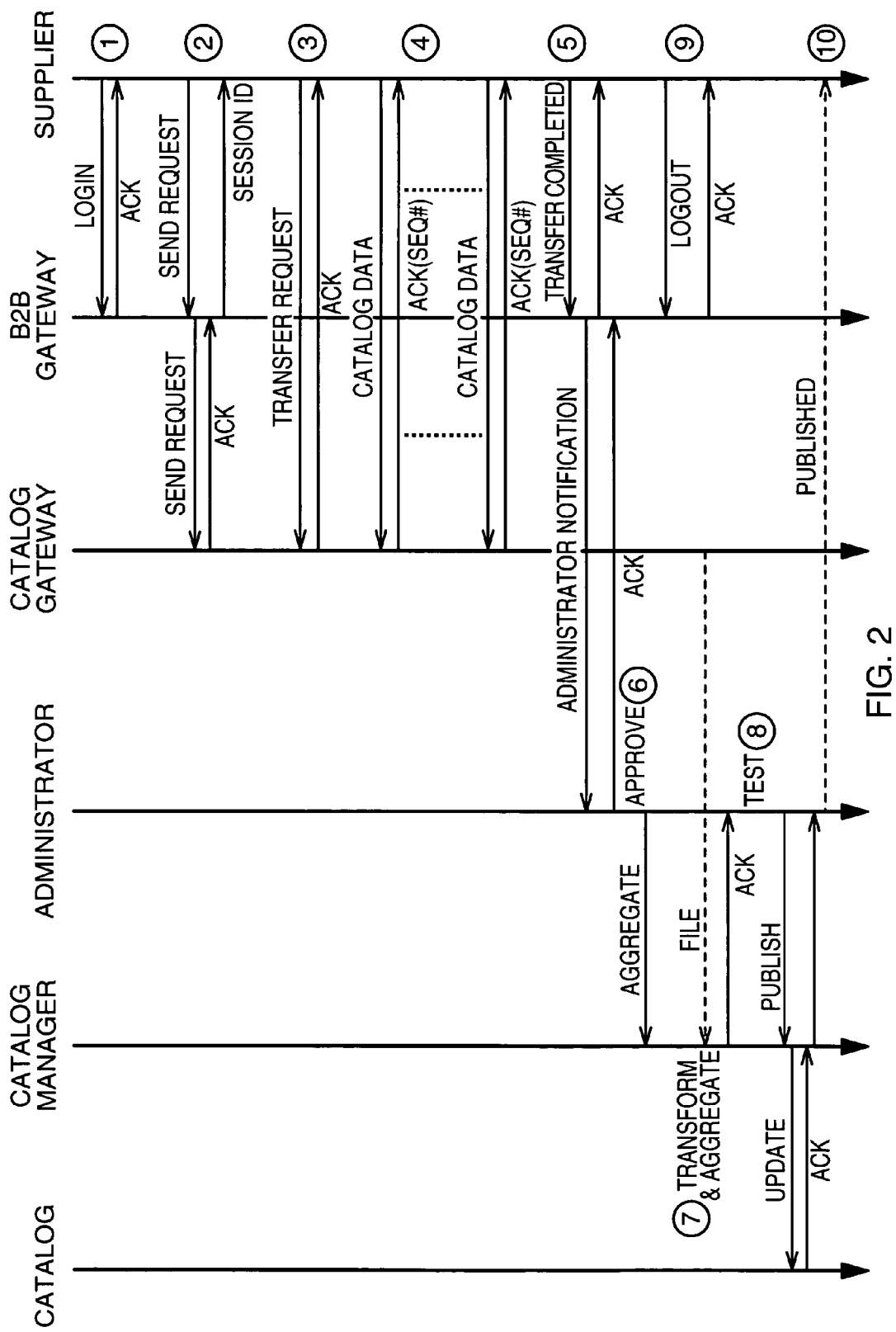
FIG. 2 is a time diagram representing the sequence of steps used in the method according to the invention.

The sequential steps of the method according to the invention are represented on the time diagram of FIG. 2. They are the following:

1. The supplier contacts the Marketplace, and identifies itself by means of a login/password or of a digital certificate. The B2B gateway performs an authentication to a Supplier Management System (not shown) and accepts or denies the supplier login.
2. The supplier requests the authorization to send a catalog file to the marketplace. The B2B gateway checks that the catalog gateway is available and returns a session identifier to the supplier, along with the URL where the supplier will reach the catalog gateway. The catalog gateway records the session id for later verifications.
3. The supplier initiates a catalog transfer session with the catalog gateway, providing the gateway with the name of the file to transfer and the session identifier. The catalog gateway checks if the request is legitimated and allocates space in its buffers and local storage to receive the file.
4. The supplier sends the catalog file segments to the catalog gateway. Each segment is numbered and a flag denotes whether or not it is the last segment. The catalog gateway acknowledges each segment, so that the supplier can check it has been properly received and can possibly perform retries at the segment level. This may also allow the supplier to implement a windowing mechanism to improve performances. On its side, the catalog gateway reassembles the segments and stores them in its local storage. The positive acknowledge of the last segment of the catalog file, when received by the supplier, implicitly terminates the file transfer.
5. The supplier informs the B2B gateway that the file transfer to the catalog gateway has been successfully completed. The B2B gateway notifies an administrator that a new catalog file has been received from a supplier. This notification follows an approval flow which results in the new file being accepted or rejected.
6. The administrator instructs the Catalog Manager application to process the new catalog file.
7. The Catalog Manager application gets the new catalog file from the local storage of the Catalog gateway, transforms, restructures, and enriches it appropriately, and aggregates it to the existing general catalog.
8. The administrator tests the updated general catalog in order to check if it is consistent. When this test is successful, the administrator instructs the Catalog Manager application to publish the new general catalog onto the Storefront web site, so customers can eventually view it and order items.
9. Meanwhile, the supplier may have closed his catalog transfer session, unless the supplier wants to proceed on with other Aggregation Requests.
10. The supplier is asynchronously notified that his catalog has been published, typically by means of an e-mail.

The invention which is described above combines the advantages of using standard Internet transport protocols (HTTP) and of using B2B gateways for authentication and authorization mechanisms with the advantages of a dedicated catalog gateway highly optimized for performing large catalog transfers with good performances when used with a specialized catalog transfer protocol.

Although the proposed invention is implemented preferentially for the transfer of catalogs, it can be implemented in other ways as follows:

a) Other kinds of e-business applications requiring the exchange of large files over the Internet between business partners. Examples are: exchanging CAD files in Collaborative Design or Product Lifecycle Management, exchanging chemical databases in Lifescience applications, exchanging video files in Digital Media applications.
b) The Catalog Transfer Protocol can be implemented in other ways: FTP, byte streams over sockets. However, these other implementations do not have the advantages of the proposed implementations using HTTP, since they are not using the standard Internet protocol. In particular, implementations not using HTTP are not compatible with the security features of HTTP proxies and firewalls.
c) The Catalog Control and Transfer protocols can be used over Virtual Private Networks in order to insure the confidentiality of the information contained within the exchanged catalogs.
d) The B2B gateway and Catalog gateway components can be physically running within the same system or the same application server, especially when the B2B gateway includes an HTTP server and a servlet engine.

The invention claimed is:

1. Method for transferring large supplier catalogs in a data transmission system including the Internet network, a marketplace site able to be addressed through said Internet network, a plurality of customers connected to said Internet network and a plurality of suppliers connected to said Internet network, each of said suppliers having a catalog file of available goods to be supplied to any one of said customers;

said method comprising the following steps:
a) Requesting by one of said suppliers the transfer of its catalog file to said marketplace site through a business to business (B2B) gateway using a catalog control protocol,
b) Transferring said catalog file to said marketplace site through a catalog gateway using the catalog transfer protocol, the supplier segmenting the catalog file into a plurality of sequential segments and sending the catalog file segments to the catalog gateway, wherein each catalog file segment is numbered and includes a flag denoting whether or not the catalog segment is the last catalog file segment, the catalog gateway acknowledging each catalog file segment received from the supplier, the catalog gateway reassembling the catalog file segments into the catalog file and storing the catalog file in a local storage,
c) Aggregating said catalog file received from said supplier to a general catalog to provide an updated general catalog, and
d) Publishing the updated general catalog onto a storefront web site so that any one of said customers can view the goods of said supplier.

2. Method according to claim 1, wherein, in said step a), the supplier identifies itself by means of a login/password, the authentication of said supplier being performed by said B2B gateway.

3. Method according to claim 2, wherein said B2B gateway returns a session identifier to said supplier along with an URL where said supplier can reach said catalog gateway.

4. Method according to claim 3, wherein said step b) further comprises initiating by said supplier a catalog transfer with said catalog gateway by providing the catalog gateway with a name of the catalog file to be transferred and said session identifier.

5. Method according to claim 1, further comprising the step of notifying by said catalog gateway an administrator that a new catalog file has been received from a supplier.

6. Method according to claim 1, wherein said step c) comprises a catalog manager obtaining said new catalog file from the local storage of said catalog gateway and aggregating it to said general catalog.

7. Method according to claim 6, wherein said step d) comprises publishing said updated general catalog by said catalog manager after said administrator has tested successfully said updated general catalog.

* * * * *